US011536590B2

(12) United States Patent
Hayashi et al.

(10) Patent No.: US 11,536,590 B2
(45) Date of Patent: Dec. 27, 2022

(54) OFFSET CORRECTION DEVICE AND POSITION MEASURING DEVICE

(71) Applicant: MITUTOYO CORPORATION, Kanagawa (JP)

(72) Inventors: Kenichi Hayashi, Kanagawa (JP); Naoki Kobayashi, Kanagawa (JP); Hiroatsu Mori, Tochigi (JP)

(73) Assignee: Mitutoyo Corp., Kanagawa (JP)

( * ) Notice: Subject to any disclaimer, the term of this patent is extended or adjusted under 35 U.S.C. 154(b) by 162 days.

(21) Appl. No.: 16/911,865

(22) Filed: Jun. 25, 2020

(65) Prior Publication Data

US 2020/0408570 A1      Dec. 31, 2020

(30) Foreign Application Priority Data

Jun. 27, 2019  (JP) .............................. JP2019-119521

(51) Int. Cl.
*G01D 5/244*        (2006.01)

(52) U.S. Cl.
CPC .................... *G01D 5/2448* (2013.01)

(58) Field of Classification Search
CPC ...... G01D 5/2448; G01D 5/206; G01D 5/245; G01D 18/001; G01D 18/008; G11B 20/10009
See application file for complete search history.

(56) References Cited

U.S. PATENT DOCUMENTS

| | | | | |
|---|---|---|---|---|
| 6,329,813 B1* | 12/2001 | Andermo | ............... | G01B 3/205 324/207.17 |
| 6,452,512 B1* | 9/2002 | Adkins | ............... | H03M 1/1009 341/13 |
| 2007/0004353 A1* | 1/2007 | Narita | .................. | H04W 52/42 455/136 |
| 2010/0260311 A1* | 10/2010 | Hung | .................. | G01D 5/2448 377/17 |
| 2013/0033257 A1* | 2/2013 | Sasaki | .................. | G01D 5/2086 324/207.17 |
| 2020/0182657 A1* | 6/2020 | Chao | .................. | G01D 5/24476 |

FOREIGN PATENT DOCUMENTS

JP         2014-025871         2/2014

OTHER PUBLICATIONS

Hiroatsu Mori et al., Miniaturized Linear Encoder "Fiber Scale", Mitutoyo Corporation, O plus E, vol. 37, No. 3, Mar. 2015, partial English translation included, 7 pages.

\* cited by examiner

*Primary Examiner* — Michael P Nghiem
*Assistant Examiner* — Dacthang P Ngo
(74) *Attorney, Agent, or Firm* — Rankin, Hill & Clark LLP (57) ABSTRACT

An offset correction device includes: an amplitude adjuster that adjusts an amplitude of a detection signal output from an encoder by adjusting a gain of the detection signal so that the amplitude is within a predetermined range; an offset corrector that corrects an offset of an amplitude center of the detection signal; and a storage that stores a relationship between the gain and an offset amount in advance, wherein the offset corrector refers to the relationship stored in the storage when the amplitude adjuster changes the gain, obtains the offset amount corresponding to the changed gain, and corrects the offset based on the obtained offset amount.

8 Claims, 10 Drawing Sheets

| GAIN | OFFSET RATIO (RATIO FROM PREVIOUS GAIN) |
|---|---|
| G1 | 1.08 |
| G2 | 1.1 |
| G3 | 1.09 |
|  |  |

OFFSET CORRECTION DEVICE AND POSITION MEASURING DEVICE

CROSS-REFERENCE TO RELATED APPLICATION

This application is based upon and claims the benefit of priority of the prior Japanese Patent Application No. 2019-119521, filed on Jun. 27, 2019, the entire contents of which are incorporated herein by reference.

FIELD

A certain aspect of embodiments described herein relates to an offset correction device and a position measuring device.

BACKGROUND

Known is a method using 2-phase sinusoidal signals as a position detection signal in encoders for detecting a relative position between a scale and a detector head (for example, see Miniaturized linear encoder "FIBER SCALE", Mitutoyo, Hiroatsu MORI, Hiroaki KAWADA, Tomotaka TAKAHASHI). In these encoders, the intensity of the detection signal may vary due to a change in the relative attitude between the scale and the detector head.

As a countermeasure against the above, automatic gain control (AGC) that automatically adjusts the gain of the detection signal is performed so that the intensity of the detection signal is within the predetermined range. However, the amplitude center of the detection signal may be offset by the AGC. As a countermeasure against the above, the technique automatically adjusting the offset is disclosed (for example, see Japanese Patent Application Publication No. 2014-25871).

SUMMARY

However, the above technique needs measurement points within a certain range in the period of the sine wave for correction. Thus, there is a time lag from the timing of gain switching until the offset is corrected.

In one aspect of the present invention, it is an object to provide an offset correction device and a position measuring device that reduce a time lag and correct an offset.

According to an aspect of the present invention, there is provided an offset correction device including: an amplitude adjuster that adjusts an amplitude of a detection signal output from an encoder by adjusting a gain of the detection signal so that the amplitude is within a predetermined range; an offset corrector that corrects an offset of an amplitude center of the detection signal; and a storage that stores a relationship between the gain and an offset amount in advance, wherein the offset corrector refers to the relationship stored in the storage when the amplitude adjuster changes the gain, obtains the offset amount corresponding to the changed gain, and corrects the offset based on the obtained offset amount.

According to another aspect of the present invention, there is provided a position measuring device including: the above offset correction device; the encoder; and an arithmetic device that calculates a position based on the detection signal of which the offset is corrected by the offset correction device.

DESCRIPTION OF EMBODIMENTS

Figure 1A:
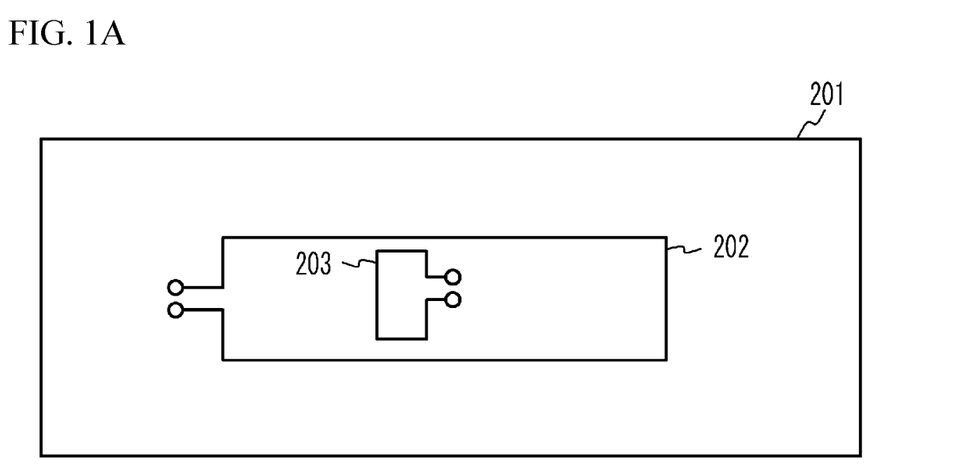
FIG. 1A illustrates a detector head.
Figure 1B:
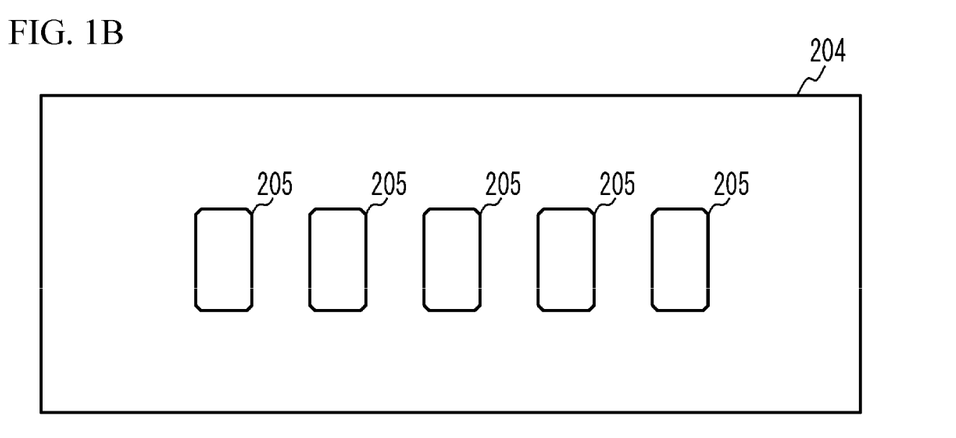
FIG. 1B illustrates a scale.

Prior to the description of embodiments, an exemplary encoder will be described. FIG. 1A illustrates a detector head 201. FIG. 1B illustrates a scale 204. The detector head 201 and the scale 204 have substantially plate shapes, and are arranged opposite to each other across a predetermined gap.

As illustrated in FIG. 1A, the detector head 201 includes a transmitter coil 202 and a receiver coil 203. The transmitter coil 202 forms a rectangular coil. The receiver coil 203 is disposed inside the transmitter coil 202.

As illustrated in FIG. 1B, in the scale 204, a plurality of coupling coils 205 is periodically arranged along the measurement axis. The coupling coils 205 are located away from each other and insulated from each other. Each coupling coil 205 is to be electromagnetically coupled to the transmitter coil 202, and is also to be electromagnetically coupled to the receiver coil 203.

A current is passed through the transmitter coil 202, and the electromotive force generated in the receiver coil 203 through the coupling coil 205 is measured as a detection signal. The position in the measurement axis of the scale 204 can be measured by using this detection signal.

Figure 2:
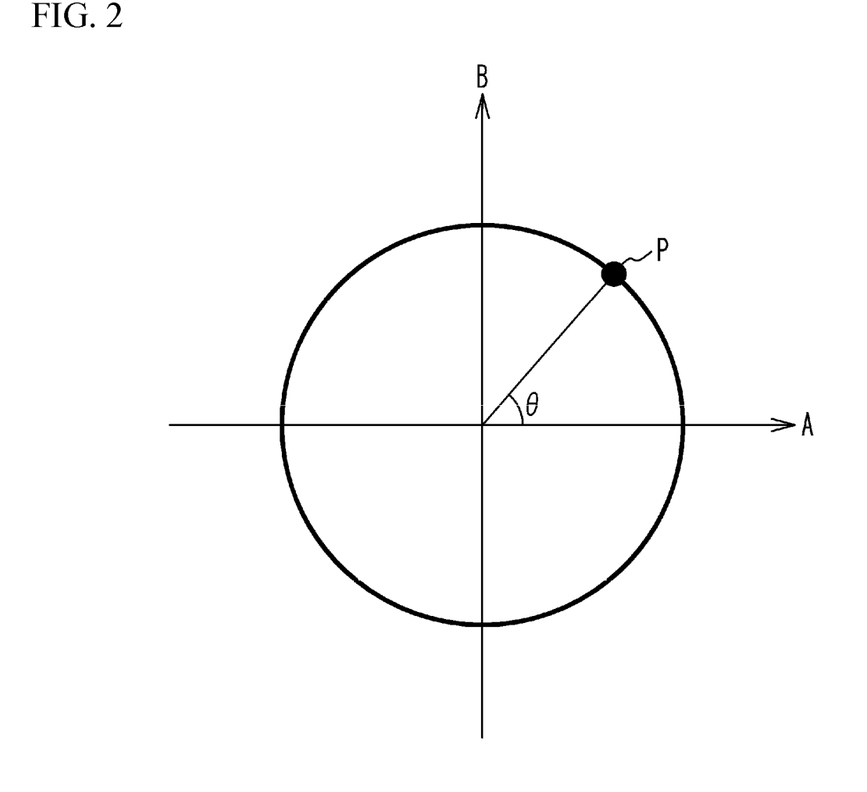
FIG. 2 illustrates calculating of a position.

In such encoders, for example, 2-phase sinusoidal signals (the Phase A signal and the Phase B signal) having phases different from each other by 90 degrees are used as the detection signal. In this system, as illustrated in FIG. 2, a Lissajous figure is drawn by 2-phase (Phase A and Phase B) sine waves having phases shifted from each other by 90 degrees, and the position is calculated by the angle θ of the output point P with reference to the center point of the Lissajous figure. In such encoders, a change in the relative attitude between the detector head 201 and the scale 204 causes the variation in the intensities of the 2-phase sinusoidal signals and waveform disturbance, resulting in failure in detection or decrease in precision.

Figure 3:
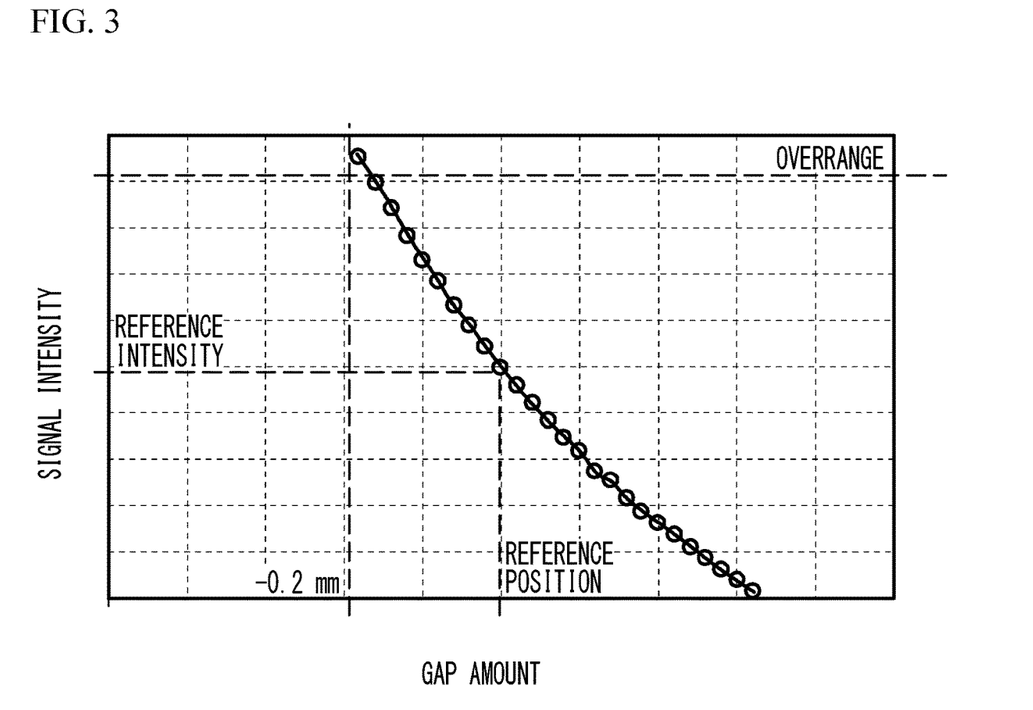
FIG. 3 illustrates the signal intensity of a detection signal obtained from a receiver coil when a gap amount between a detector head and a scale is varied from a reference position.

FIG. 3 illustrates the signal intensity of the detection signal obtained from the receiver coil 203 when the gap amount between the detector head 201 and the scale 204 is varied from the reference position. The signal intensity of the detection signal means the amplitude. In FIG. 3, the horizontal axis represents the variation in the gap amount, and the vertical axis represents the signal intensity. As illustrated in FIG. 3, as the gap amount increases, the signal intensity decreases, and as the gap amount decreases, the signal intensity increases.

In the example of FIG. 3, the gap amount varies from the reference position by −0.2 mm, and the signal intensity increases to the outside of the detection range (the over-range). In this case, it is difficult to calculate the position normally. This means that the encoder is unable to deliver its original performance when the device body to which the encoder is attached slides and the positional displacement occurs, and thereby the relative position between the detector head 201 and the scale 204 changes or when the position of the device body changes from the initial installation state of the device body over time.

Figure 4:
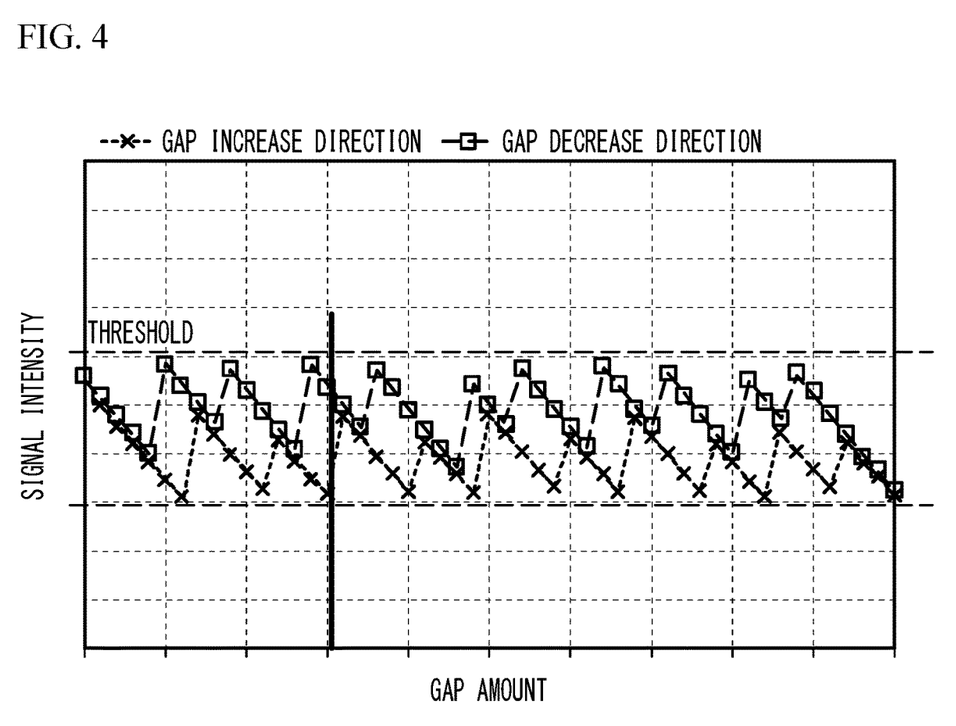
FIG. 4 illustrates a signal intensity when a predetermined threshold is set and AGC is performed.

The use of the automatic gain control (AGC) that automatically adjusts the gain of the detection signal according to the magnitude of the signal intensity reduces the variation in the signal intensity due to the change in attitude during use of the encoder. FIG. 4 illustrates a signal intensity when a predetermined threshold is set and the AGC is performed. In FIG. 4, the horizontal axis represents a gap amount, and the vertical axis represents a signal intensity. As illustrated in FIG. 4, the signal intensity falls within a predetermined range regardless of whether the gap amount is large or small by performing the AGC. Thus, achieved is the encoder that does not depend on the sliding performance of the device in which the encoder is installed and has a resistance to the chronological change.

On the other hand, as described above, when the output position of the encoder is calculated based on the angle from the center point of a Lissajous figure, offset correction for adjusting the center value to zero by performing the signal coordination after the installation of the encoder is necessary.

Figure 5:
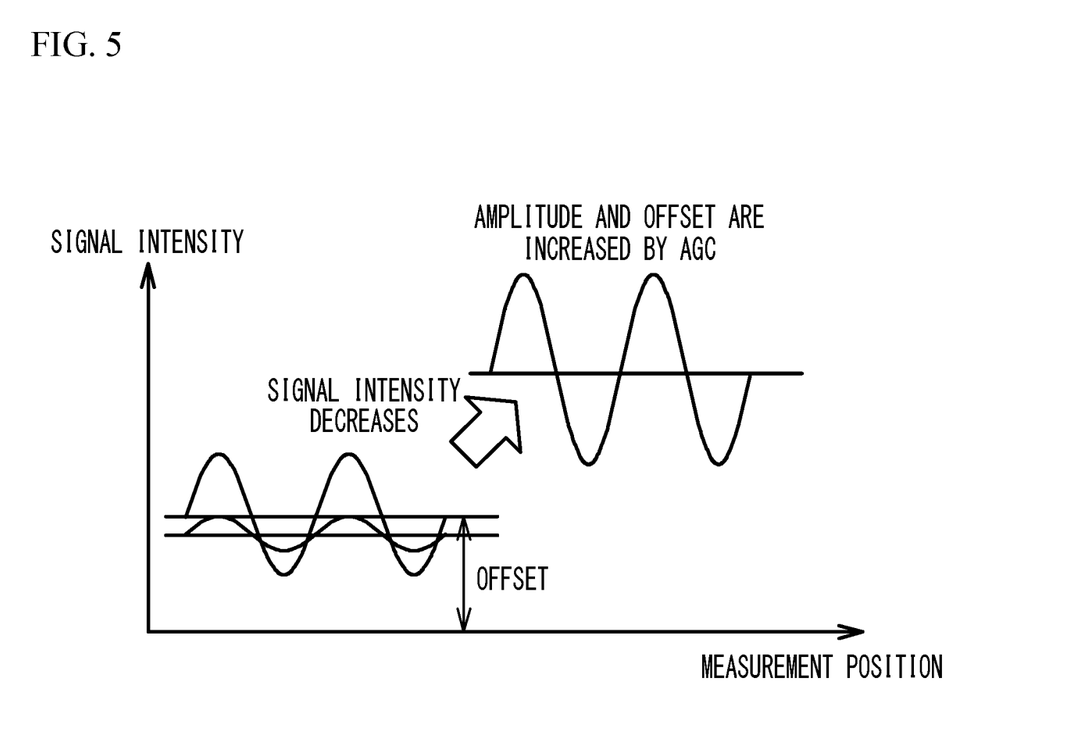
FIG. 5 illustrates a variation in the center value of a sine wave.
Figure 6:
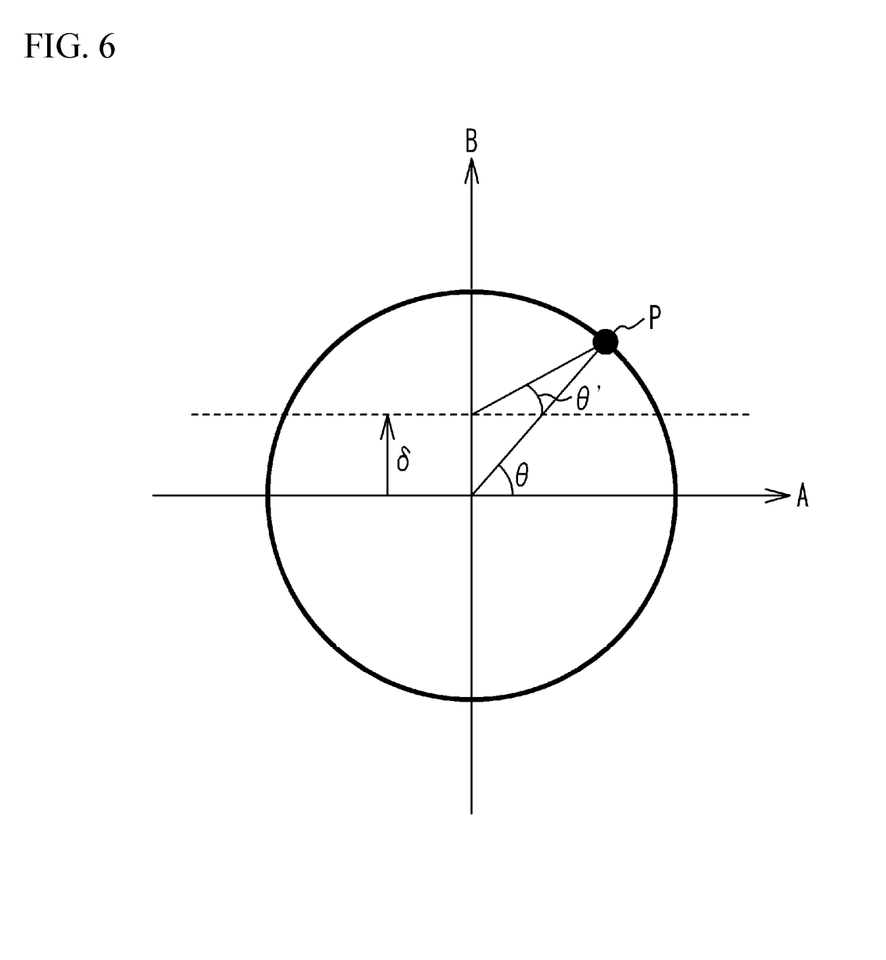
FIG. 6 illustrates an error in a detection signal.

However, the signal intensity may vary during the actual measurement because of the change in the relative position between the detector head 201 and the scale 204 after the offset is corrected. When the gain is adjusted by the AGC according to the variation in the signal intensity, the center value of the sine wave obtained as the detection signal may also vary as illustrated in FIG. 5. A variation 6 in the center value changes the angle θ of the output point P to the angle θ' as illustrated in FIG. 6, resulting in an error in the value of the detection signal. As the ratio of variation in the gain increases, the value of the error increases.

As a countermeasure against the above, it may be considered to use a technique that automatically corrects the offset of the detection signal output from the encoder. However, when the measurement points within a certain range in the period of the sine wave are required for correction, there is a time lag from the timing of gain switching until the correction is applied. Additionally, the calculation load for the correction is also caused, negatively affecting the throughput of the measurement. Furthermore, the increase in error after the gain switching can be reduced, but is impossible to be zero.

Thus, in the following embodiments, an offset correction device and a position measuring device that can reduce a time lag and correct the offset will be described.

First Embodiment

Figure 7A:
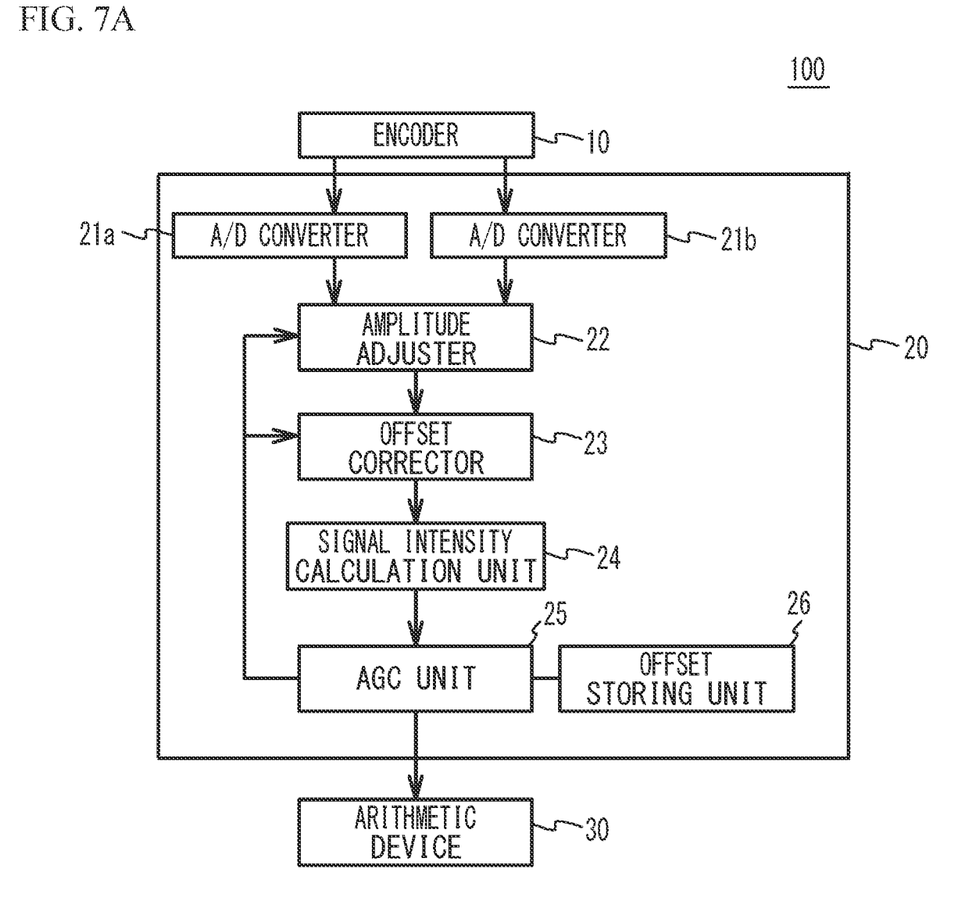
FIG. 7A illustrates a configuration of a position measuring device in accordance with embodiments.

FIG. 7A illustrates a configuration of a position measuring device 100 in accordance with embodiments. As illustrated in FIG. 7A, the position measuring device 100 includes an encoder 10, an offset correction device 20, and an arithmetic device 30. The detection principle of the encoder 10 is not particularly limited as long as the encoder 10 outputs sinusoidal signals having phases different from each other. Examples of the encoder 10 include, but are not limited to, a photoelectric encoder and an electromagnetic induction encoder. The encoder 10 is a linear encoder, a rotary encoder, or the like. In the present embodiment, the encoder 10 outputs 2-phase sinusoidal signals (the Phase A signal and the Phase B signal) having phases different by 90 degrees.

Figure 7B:
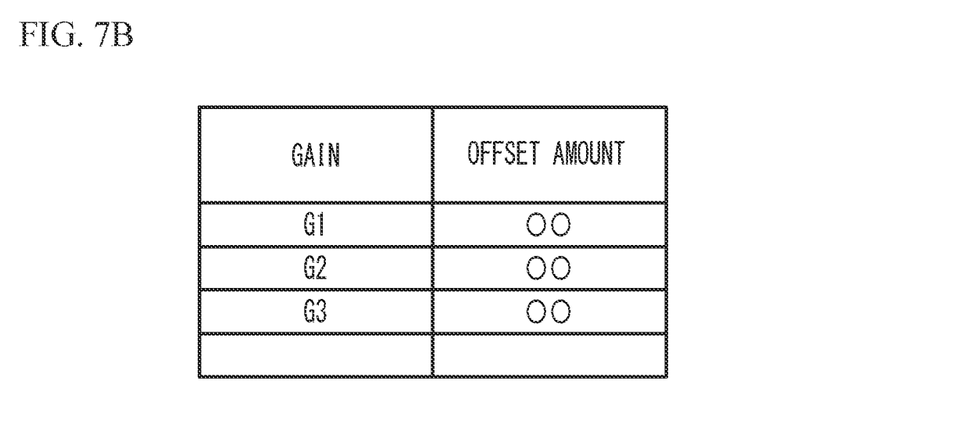
FIG. 7B illustrates a table stored in an offset storage unit.

The offset correction device 20 includes two analog/digital (A/D) converters 21a and 21b, an amplitude adjuster 22, an offset corrector 23, a signal intensity calculation unit 24, an AGC unit 25, and an offset storage unit 26. As illustrated in FIG. 7B, the offset storage unit 26 stores a relationship between the setting values G1, G2, G3, . . . of the gain and the respective offset amounts as a table. The relationship between the setting value of the gain and the offset amount can be obtained through experiments or the like in advance.

The A/D converter 21a digitizes the Phase A signal by sampling the Phase A signal output from the encoder 10 at a predetermined sampling period. The A/D converter 21b digitizes the Phase B signal by sampling the Phase B signal output from the encoder 10 at a predetermined sampling period.

The amplitude adjuster 22 adjusts the amplitudes of the Phase A signal and the Phase B signal by multiplying the Phase A signal and the Phase B signal by a gain (an amplification factor). The offset corrector 23 corrects the offsets of the center values of the Phase A signal and the Phase B signal after the adjustment of the amplitude. For example, the initial gain is set by the user as the initial setting of the position measuring device 100. In addition, the offset amount to be used by the offset corrector 23 is set by the user as the initial setting of the position measuring device 100.

The signal intensity calculation unit 24 calculates the signal intensities (the amplitudes) of the Phase A signal and the Phase B signal after the offset correction at the time of actual measurement after initial setting. The AGC unit 25 performs the AGC according to the calculation result by the signal intensity calculation unit 24 so that the signal intensities of the Phase A signal and the Phase B signal are within the detection range. More specifically, the AGC unit 25 increases the gain when the signal intensities of the Phase A signal and the Phase B signal are less than a first threshold, and decreases the gain when the signal intensities are greater than a second threshold. The AGC unit 25 sets the obtained gain to the amplitude adjuster 22. The amplitude adjuster 22 adjusts the amplitudes of the Phase A signal and the Phase B signal with use of the set gain. In this case, the AGC unit 25 refers to the offset storage unit 26 to read the offset amount corresponding to the gain set to the amplitude adjuster 22 and sets the read offset amount to the offset corrector 23. The offset corrector 23 corrects the offsets of the Phase A signal and the Phase B signal with use of the set offset amount.

The arithmetic device 30 calculates the position with use of the Phase A signal and the Phase B signal after the amplitude adjustment by the amplitude adjuster 22 and the offset correction by the offset corrector 23. More specifically, in the encoder 10, the displacement amount of the relative position between the detector head and the scale in the measurement axis is calculated.

In the present embodiment, the amount of the offset caused by gain switching is obtained through experiments or the like in advance, and the offset storage unit 26 stores the relationship between the gain and the offset amount. This enables to appropriately set the offset correction amount when the gain is switched by performing the AGC. In this case, since only reading of the offset amount is necessary, the offset correction is performed at substantially the same time as the gain switching. Accordingly, the offset can be corrected while the time lag is reduced.

In addition, even when the chronological change is caused after the initial setting, the gain can be appropriately adjusted, and the offset can be also appropriately corrected. In addition, since the offset can be corrected only by reading the offset amount, the calculation load is reduced. As a result, the influence on the throughput of the position measurement is reduced. In addition, the offset after gain switching can be made to be zero by obtaining the offset amount that causes the offset to be zero when the relationship between the gain and the offset amount is stored in the offset storage unit 26 in advance.

Figure 8:
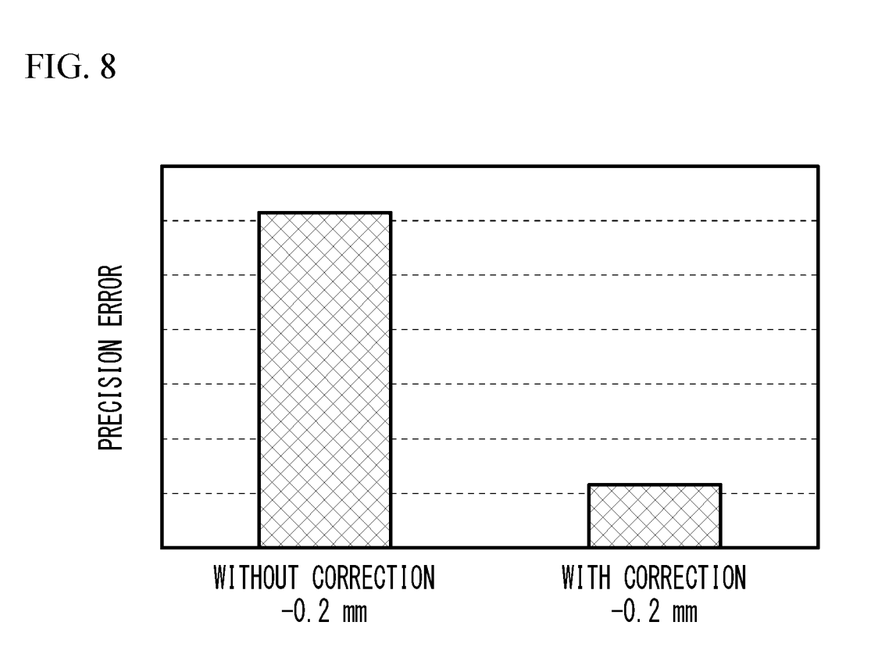
FIG. 8 illustrates a precision error.

"WITHOUT CORRECTION" in FIG. 8 indicates the precision error in the case where the offset correction using the relationship stored in the offset storage unit 26 is not performed when the gap between the detector head and the scale in the encoder 10 is varied by −0.2 mm. "WITH CORRECTION" in FIG. 8 indicates the precision error in the case where the offset correction using the relationship stored in the offset storage unit 26 is performed when the gap between the detector head and the scale in the encoder 10 is varied by −0.2 mm. As the offset error due to the inexecution of the offset correction increases, the precision error increases. In the example of FIG. 8, the precision error in the case of "WITH CORRECTION" is reduced from the precision error in the case of "WITHOUT CORRECTION" by approximately 80%.

Figure 9:
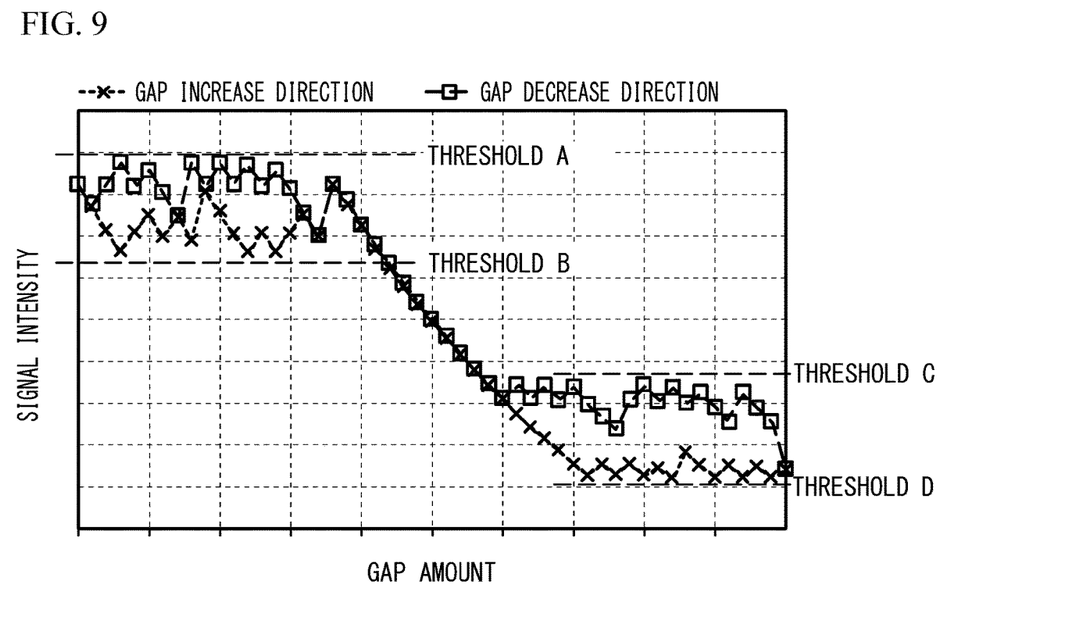
FIG. 9 illustrates the signal intensity of an output signal when a plurality of thresholds is set for each gain.

The amplitude adjuster 22 may vary, according to the value of the gain, the threshold when the AGC is performed. For example, the amplitude adjuster 22 may use the gain setting value at the reference position in the wide range by setting the thresholds for switching the gain setting value at different values according to each gain setting value. For example, the signal intensity of the output signal when the thresholds are set for each gain is illustrated in FIG. 9. This configuration allows the AGC to cope with the large gap variation, and allows the region that can keep the error due to the offset variation to a minimum without switching the gain around the reference position to be wide.

The offset storage unit 26 may be non-rewritable or rewritable. For example, the relationship between the gain and the offset amount stored in the offset storage unit 26 may be rewritten from an external device through the interface of the position measuring device 100. In this configuration, the information stored in the offset storage unit 26 can be updated as necessary.

Second Embodiment

In the first embodiment, combinations of the gains and the offset amounts are stored in the offset storage unit 26, but this does not intend to suggest any limitation. In a second embodiment, as illustrated in FIG. 10, the ratio of variation in the amount of the offset caused by performing the gain switching in experiments is stored in the offset storage unit 26.

For example, the ratio of variation in the offset in each gain can be created by the manufacturer in advance. After shipping, a signal is read at a freely-selected gain position once in the environment where the encoder is installed by the user, and the offset value (the absolute amount) is calculated. When the value is introduced to one entry in the correction table, the offset correction amounts corresponding to other gains can be automatically calculated from the set ratio of variation. The user only needs to obtain a signal at one freely selected position. Therefore, the offset storage unit that reduces the effects of the environmental change and the change in attitude between the time of manufacture and the time of use and reflects the usage environment can be created and thereby, more precise measurement is achieved while the workload is minimum.

In the configuration illustrated in FIG. 7, the signal adjustment unit and the offset corrector are commonly provided for the Phase A signal and the Phase B signal. On the other hand, the offset amount for the Phase A may become unequal to the offset amount for the Phase B. For example, the correction amount in a certain gain may be different, such as 50 for the Phase A and 80 for the Phase B. When the same correction amount is used, it may become difficult to increase the accuracy. However, when the common ratio of variation is stored and the obtained respective offset amounts at the freely-selected position for the Phase A and the Phase B are multiplied by the amplification factor, the respective offset correction amounts for the Phase A and the Phase B are calculated, and more precise measurement becomes possible.

Figure 10:
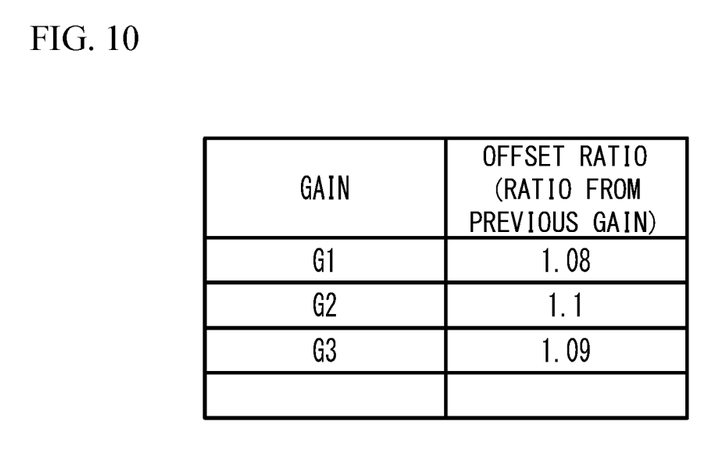
FIG. 10 illustrates a table stored in the offset storage unit.

For example, when the offset amount for the gain1 is 100 at the time of actual use, the gain2 is automatically calculated as 110, and the gain3 is automatically calculated as 119.9 by using the ratio of variation in the amount of the offset illustrated in FIG. 10. This calculation can be performed with respect to each phase.

In the present embodiment, the amount of the offset caused by switching the gain is obtained in advance through experiments, and the ratio of variation in the offset amount is stored in the offset storage unit 26. This allows the offset correction amount when the gain is switched by performing the AGC to be appropriately set. This improves the measurement precision. Since the offset is corrected at the same time as the gain is switched, a time lag from the gain switching to the correction is reduced. In addition, when the gain is switched, it is only necessary to read the ratio of variation in the offset amount and perform multiplication, the calculation load is reduced. Furthermore, the user only needs to obtain a signal at one freely selected position in a correction work. Thus, a work burden on a user can be minimized, and the effects of the environmental change and the change in attitude between the time of manufacture and the time of use can be reduced.

In the above examples, the amplitude adjuster 22 functions as an example of an amplitude adjuster that adjusts the amplitude by adjusting the gain of the detection signal so that the amplitude of the detection signal output from the encoder is within a predetermined range. The offset corrector 23 functions as an example of an offset corrector that corrects the offset of the amplitude center of the detection signal. The offset storage unit 26 functions as an example of a storage unit that stores a relationship between the gain and the offset amount in advance.

The present invention is not limited to the specifically disclosed embodiments and variations but may include other embodiments and variations without departing from the scope of the present invention.

What is claimed is:
1. An offset correction device comprising:
a processor configured to adjust an amplitude of a detection signal output from an encoder by adjusting a gain of the detection signal so that the amplitude is within a predetermined range, by increasing the gain when an intensity of the detection signal is less than a first threshold and decreasing the gain when the intensity of the detection signal is greater than a second threshold, and configured to correct an offset of an amplitude center of the detection signal; and a storage that stores a relationship between the gain and an offset amount in advance, wherein the encoder has a transmitter coil configured to generate magnetic flux, a plurality of conductors that are arrayed in a measurement axis direction, are configured to be electromagnetically coupled with the magnetic flux generated by the transmitter coil and generate magnetic flux that fluctuates in a predetermined spatial period in the measurement axis direction, and a receiver coil configured to be electromagnetically coupled with the magnetic flux generated by the plurality of conductors and detect a phase of the magnetic flux, wherein the encoder outputs sine wave signals of which phases are different from each other, as the detection signal, wherein the processor refers to the relationship stored in the storage when the processor changes the gain, obtains the offset amount corresponding to the changed gain, and corrects the offset based on the obtained offset amount, and wherein the processor varies the predetermined range according to a value of the gain, by changing the first threshold and the second threshold according to the gain.

2. The offset correction device according to claim 1, wherein the storage stores values of the gain, the values being set in a stepwise manner, and stores the offset amount corresponding to each value of the gain.

3. The offset correction device according to claim 1, wherein the storage stores the offset amount as a ratio of variation with respect to an offset amount corresponding to a predetermined gain.

4. The offset correction device according to claim 3, wherein the encoder has a detection head having the transmitter coil and the receiver coil, and a scale having the plurality of conductors, and wherein the detection head faces the scale and is configured to relatively move with respect to the scale in a measurement axis direction.

5. The offset correction device according to claim 1, wherein the relationship between the gain and the offset stored in the storage is writable.

6. The offset correction device according to claim 5, wherein the encoder has a detection head having the transmitter coil and the receiver coil, and a scale having the plurality of conductors, and wherein the detection head faces the scale and is configured to relatively move with respect to the scale in a measurement axis direction.

7. A position measuring device comprising:

the offset correction device according to claim 1;

the encoder; and a second processor that calculates a position based on the detection signal of which the offset is corrected by the offset correction device.

8. The offset correction device according to claim 1, wherein the storage stores each offset amount with respect to each of the sine wave signals, and wherein the processor corrects the offset by using of a common changing rate with respect to the sign wave signals.

* * * * *

UNITED STATES PATENT AND TRADEMARK OFFICE
CERTIFICATE OF CORRECTION

PATENT NO. : 11,536,590 B2
APPLICATION NO. : 16/911865
DATED : December 27, 2022
INVENTOR(S) : Kenichi Hayashi et al.

It is certified that error appears in the above-identified patent and that said Letters Patent is hereby corrected as shown below:

On the Title Page

Item (73) Assignee:
Change "Mitutoyo Corp." to --Mitutoyo Corporation--.

Signed and Sealed this
Fourteenth Day of November, 2023

Katherine Kelly Vidal
*Director of the United States Patent and Trademark Office*